United States Patent [19]

Kobayashi

[11] Patent Number: 4,618,048
[45] Date of Patent: Oct. 21, 1986

[54] CLUTCH DISK ASSEMBLY

[75] Inventor: Kiyonori Kobayashi, Toyota, Japan

[73] Assignee: Aisin Seiki Kabushiki Kaisha, Kariya, Japan

[21] Appl. No.: 507,016

[22] Filed: Jun. 23, 1983

[30] Foreign Application Priority Data

Jun. 29, 1982 [JP] Japan .................. 57-112092
Jul. 31, 1982 [JP] Japan .................. 57-133868
Jul. 31, 1982 [JP] Japan .................. 57-133869

[51] Int. Cl.⁴ .......................................... F16D 3/14
[52] U.S. Cl. .............. 192/106.2; 192/70.18; 464/68
[58] Field of Search .......... 192/106.1, 106.2, 70.17, 192/70.18; 464/64, 66, 68

[56] References Cited

U.S. PATENT DOCUMENTS

| | | | |
|---|---|---|---|
| 3,327,820 | 6/1967 | Maurice | 192/55 |
| 3,931,876 | 1/1976 | Beeskow et al. | 192/106.2 |
| 4,036,341 | 7/1977 | Beeskow et al. | 192/106.2 |
| 4,122,931 | 10/1978 | Maucher | 192/106.2 |
| 4,366,893 | 1/1983 | Billet | 192/106.2 |
| 4,381,052 | 4/1983 | Maucher | 192/106.2 |
| 4,406,357 | 9/1983 | Nagano et al. | 464/68 X |
| 4,470,494 | 9/1984 | Takeuchi | 192/70.17 X |
| 4,485,907 | 12/1984 | Nishimura | 192/106.2 |
| 4,493,408 | 1/1985 | Nagano | 192/106.2 |

Primary Examiner—Samuel Scott
Assistant Examiner—Allen J. Flanigan
Attorney, Agent, or Firm—Burns, Doane, Swecker & Mathis

[57] ABSTRACT

A clutch assembly has first and second friction generating means for resisting movement of the clutch plate relative to a sub-plate, and movement of the sub-plate relative to the hub. Disposed between the hub flange and the friction lining carrier plates, the first and second friction generating means include a pair of control plates linked to form a control member, friction means, and axial force exerting means disposed so that the friction means are pressed against either the hub flange, a carrier plate, or a control plate, to generate frictional resistance force. The control member is made sufficiently rigid and is so arranged relative to the hub flange, friction means, force exerting means, and carrier plates, so that the force exerted by the axial force exerting means of the first friction generating means will not interfere with the force exerted by the axial force exerting means of the second friction generating means.

10 Claims, 7 Drawing Figures

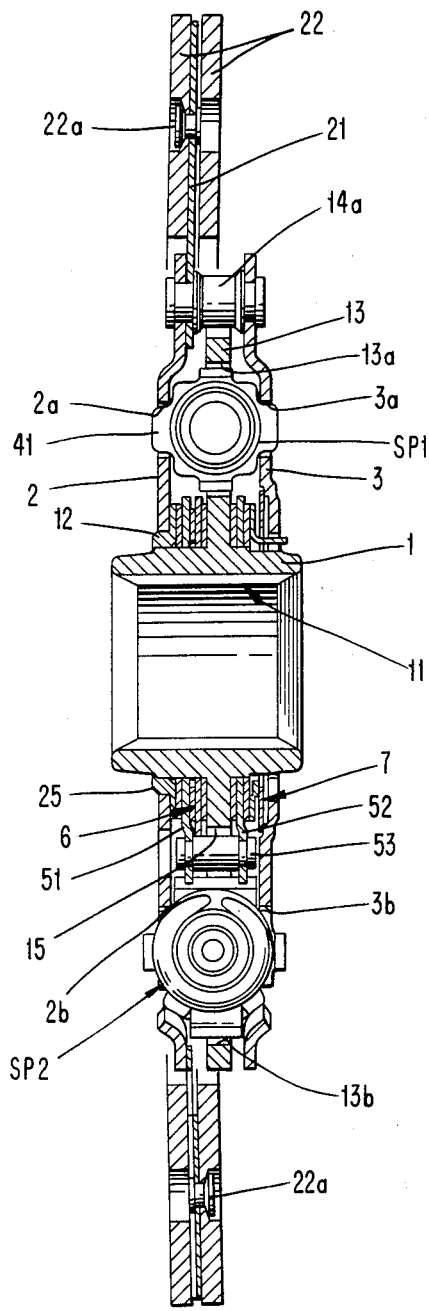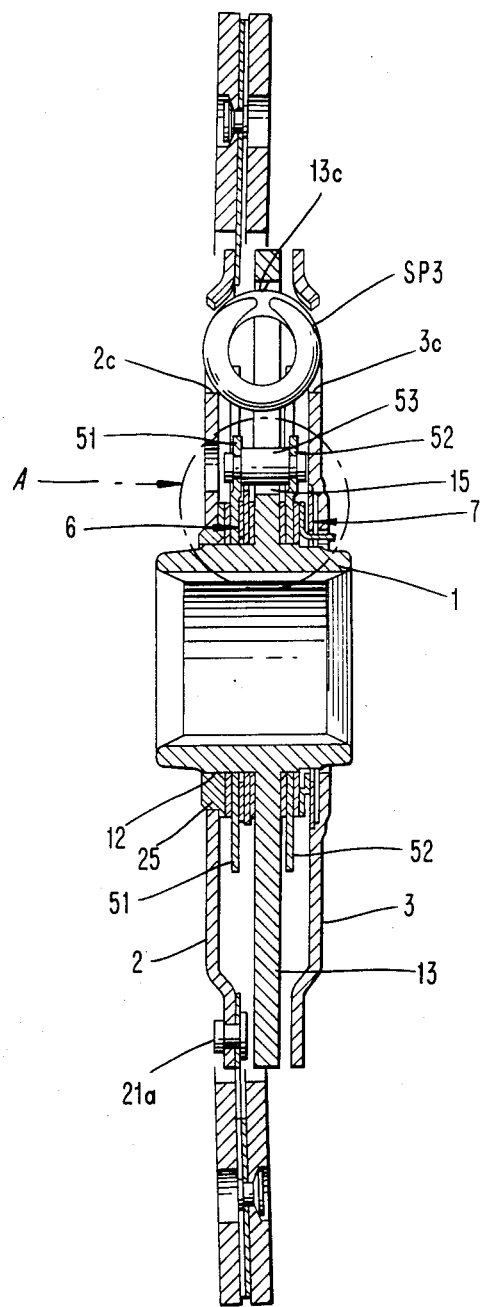

CLUTCH DISK ASSEMBLY

BACKGROUND OF THE INVENTION

1. Field of the Invention

The present invention relates to a clutch disk assembly, and more particularly to a clutch disk assembly for use in motor vehicles which have a vibration dampener assembly for taking up torsional vibrations caused by a vehicle engine in the power train.

2. Description of the Prior Art

Clutch disk assemblies for use in motor vehicles are placed in a power train including a gear transmission for transmitting power from a vehicle engine to wheels to drive the motor vehicle. The clutch disk assembly serves to connect and disconnect the power flow from a vehicle engine to the gear transmission, and also to dampen cyclic power pulses or torsional vibrations emanating from the vehicle engine.

Motor vehicles with such clutch disk assemblies have been troubled with the problem of noise produced by the cyclic torsional vibrations from a vehicle engine in coaction with backlash between meshing gears in the gear transmission. For example, when the gear transmission is in a neutral position with the engine running slowly with a small torque, the gear transmission gives off so-called neutral noise due to backlash between intermeshing gears. When the gear transmission is in a high gear (such as when the engine is directly connected to the transmission main shaft) with the engine running at a high speed with a relatively large torque, the gear transmission produces no such neutral noise, but a somewhat confined sound due to high-frequency vibrations.

To neutralize such vibrations, it is necessary for clutch disk assemblies to be equipped with a vibration dampener assembly capable of providing different dampening characteristics that counteract each other. The vibration dampener assembly should have a smaller torsion-resistant rigidity and a smaller dampening resistance. Such a property however fails to suppress the confined sound produced when the engine rotates at a high speed with a relatively large torque. To eliminate the confined sound, the vibration dampener assembly is required to have a greater torsion-resistant ridigity and a larger dampening resistance.

Various clutch disk assemblies have been proposed which have a vibration dampener assembly including spring members, frictional resistance members, and mechanisms for actuating these members for dampening cyclic rotative power pulses emanating from the engine in order to absorb the foregoing vibrations with the different dampening characteristics. Representative examples are disclosed in Japanese Laid-Open Patent Publication No. 113,845 published on Sept. 8, 1981 and U.S. Pat. No. 3,327,820 patented on June 27, 1967.

Each of the diclosed devices is composed of spring members disposed between two members which are rotatable relative to each other, frictional resistance members for presenting a prescribed resistive force to relative rotation of the two members, and a central member for actuating the spring members and the frictional resistance members in a step-like manner dependent on the relative angular displacements of the two members.

The applicant conducted various experiments on the prior clutch disk assembly and confirmed as a result that the disclosed clutch disk assembly was able to neutralize the unwanted torsional vibrations to the extent which is practically acceptable.

However, the applicant also found the following difficulties as a result of the experiments. When a control member made of a thin plate of low rigidity and is used for actuating frictional resistance members which give a relatively small frictional resistive force to absorb the neutral noise, the force exerted on other frictional resistance members for imposing a relatively large frictional resistive force also acts on the frictional resistance members for giving the relatively small frictional resistive force. It then becomes practically difficult for the latter frictional resistance members to impose the desired small frictional resistive force. The frictional resistive force cannot be maintained stable for a long period of time. Stated otherwise, so-called hysteresis cannot be stabilized as plotted on a graphic representation of the relationship between torque and angular displacement when frictional resistive forces are applied.

SUMMARY OF THE INVENTION

Accordingly, it is an object of the present invention to provide a clutch disk assembly which will eliminate the foregoing prior art shortcomings.

Another object of the present invention is to provide a clutch disk assembly having two resistance means each having axial force exerting means arranged out of mutual interference for keeping hysteresis stable for a prolonged period of time.

Still another object of the present invention is to provide a clutch disk assmebly which has small-size control members, is subjected as a whole to a relatively small moment of inertia, and enables a clutch to be disconnected sharply.

Still another object of the present invention is to provide a clutch disk assembly which has relatively large windows in which spring members are placed for allowing a greater angular displacement, and which is capable of establishing torque-angular displacement characteristics effective for reducing various vibrations and noises.

A still further object of the present invention is to provide a clutch disk assembly having a relatively small axial length and a simple construction.

The above objects can be achieved by a clutch disk assembly comprising a hub member adapted to be coupled to a transmission shaft, a flange member mounted on the hub member for corotation, a drive plate extending parallel to the flange member and rotatable relative to the hub member, a friction lining secured to a radially outward portion of the drive plate, a sub-plate extending parallel to the flange member and arranged axially and remotely from the drive plate across the flance member for rotation with the drive plate, spring members mounted in windows defined in the sub-plate, the drive plate, and the flange member and disposed axially across the flange member, the drive plate, and the sub-plate for producing resistive forces against relative rotation of the flange member and the drive plate and the sub-plate, a control member positioned between the flange member and the drive plate and the sub-plate and disposed astride of the flange member through notches defined therein radially inwardly of the windows, the control member being engageable with the drive plate and the sub-plate and rotatable relatively to the flange member in one operative range of relative rotation of the flange member and the drive plate and the sub-plate, and being releasable from engagement with the drive plate and the sub-plate, engageable with the flange member, and rotatable relatively to the drive plate and the sub-plate in another operative range of the relative rotation, a first resistance means including first force exerting means sandwiched between the control member and the flange member for exerting an axial force that produces a frictional resistive force against relative rotation of the control member and the flange member, and a second resistance means including second force exerting means sandwiched between the control member and the drive plate and the sub-plate for exerting an axial force that produces a frictional resistive force against relative rotation of the control member and the drive plate and the sub-plate, the spring members including a first spring member for producing a resistive force in said one operative range and a second spring member for producing a resistive force in said another operative range, the control member having an arm extending radially outwardly into engagement with circumferentially opposite ends of the second resilient member, said control member being sufficiently axially rigid so that the forces of the first and second force exerting means are prevented from interfering with each other.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a cross-sectional view taken along line II—II of FIG. 1;

FIG. 3 is a cross-sectional view taken along line III—III of FIG. 1;

DESCRIPTION OF THE PREFERRED EMBODIMENT

Figure 1:
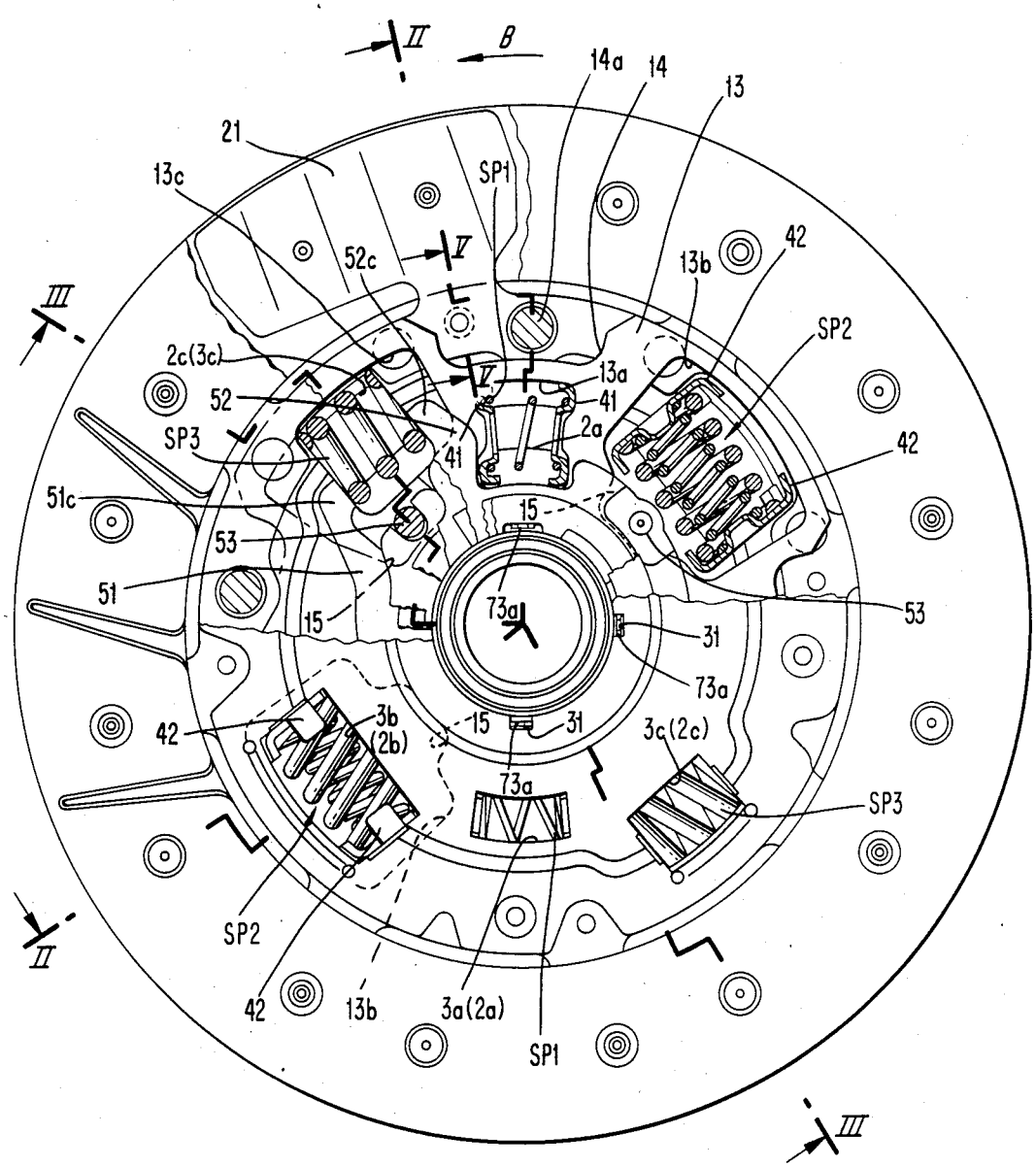
FIG. 1 is a front elevational view of a clutch disk assembly according to an embodiment of the present invention.

As shown in FIGS. 1 through 3, a hub member 1 is axially slidably fitted over a transmission shaft (not shown) serving normally as an input shaft of a gear transmission by splines 11 formed on an inner peripheral surface of the hub member 1. The hub member 1 includes a sleeve 12 having an integral flange member 13 extending radially outwardly therefrom. A drive plate 2 and a sub-plate 3 are disposed one on each side axially of the flange member 13 in parallel relation thereto and relatively rotatable with respect to the latter. The drive plate 2 and the sub-plate 3 are secured together by connecting pins 14a extending axially through recesses 14 defining a radially outward edge of the flange member 13.

A bushing 25 is secured to a radially inward edge of the drive plate 2 and supported on the sleeve 12 for slidable rotation thereon. A suitable number of friction springs 21 are affixed by rivets 21a to a radially outward edge portion of the drive plate 2. Friction linings 22, 22 are fastened by rivets 22a to opposite sides of the friction springs 21.

The flange member 13, the drive plate 2, and the subplate 3 have spring windows 13a, 2a, 3a; 13b, 2b, 3b; 13c, 2c, 3c.

Spring members SP1 in the form of coil springs are disposed in the spring windows 13a, 2a, 3a and have ends seated on spring washers 41 having ends engaging in the windows 13a, 2a, 3a. Likewise, spring members SP2 in the form of coil springs are disposed in the spring windows 13b, 2b, 3b and have ends seated on spring washers 42 having ends engaging in the windows 13b, 2b, 3b. Spring members SP3 in the form of coil springs are disposed in the spring windows 13c, 2c, 3c. When the parts of the clutch disk assembly are in the normal position of FIG. 1, the ends of the coil springs SP3 are seated on circumferential edges of the spring windows 2c, 3c in the drive plate 3 and the sub-plate 3 and spaced prescribed angular intervals from circumferential edges of the spring windows 13c in the flange member 13. Under the normal condition as shown in FIG. 1, the ends of the coil springs SP2 are spaced at prescribed angular intervals from the spring windows 13b in the flange member 13.

A pair of control plates 51, 52 are disposed between the flange member 13, the drive plate 2, and the sub-plate 3 parallel to the flange member 13. The control plates 51, 52 are interconnected by connecting pins 53 extending axially through notches 15, 15 defined in the flange member 13 radially inwardly of the spring windows 13b, 13c. The control plates 51, 52 jointly constitute a control member 5 disposed astride of the flange member 13 through the notches 15, 15.

Figure 4:
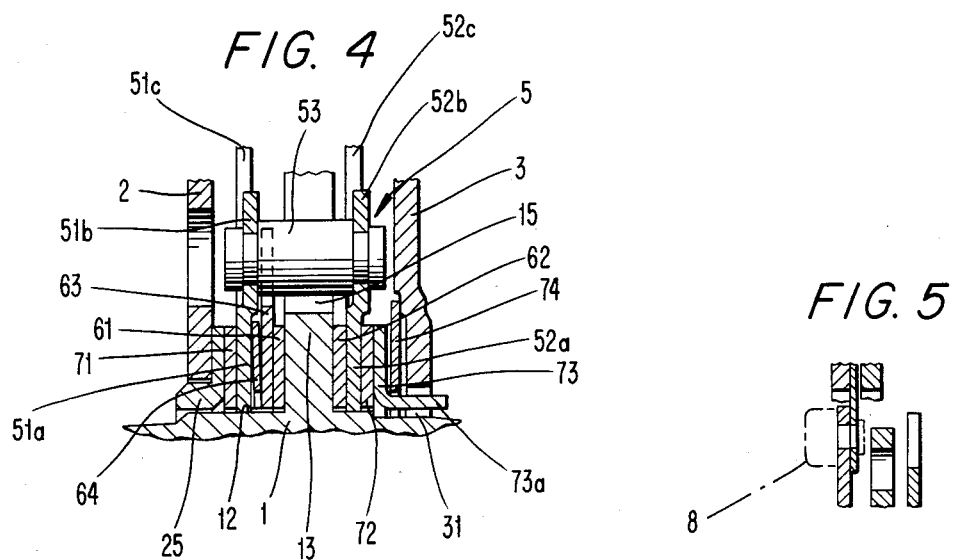
FIG. 4 is an enlarged cross-sectional view of an encircled portion A in FIG. 3.

As shown in FIG. 4, the control plates 51, 52 comprise frictional contact surfaces 51a, 52a, respectively, integral projections 51b, 52b, respectively, axially displaced (to the right as shown) by a distance equal to half of the thickness of the control plates 51, 52, for example, and supporting the connecting pins 53, and arm portions 51c, 52c extending radially outwardly from the frictional contact surfaces 51a, 52a into engagement with the ends of the coil springs SP3.

The control plates 51, 52 may be of identical configuration. The conrol plate 51 is positioned such that the disposed projection 51b is closer (rightward) to the flange member 13, and the control plate 52 is positioned such that the displaced projection 52b is remote (rightward) from the flange member 13.

Friction plates 61, 62 are placed between the frictional contact surfaces 51a, 52a of the control plates 51, 52 and opposite side surfaces of the flange member 13. A first pressure plate 63 is arranged between the friction plate 61 and the control plate 51 and coupled with the connecting pins 53 for axial movement only. The friction plates 61, 62 are sandwiched between the opposite side surfaces of the flange member 13 and the control member 5 under the resiliency of a first spring means 64 such as a disc spring disposed under compression between the pressure plate 63 and the frictional contact surface 51a. The friction plates 61, 62, the first pressure plate 63, and the first spring means 64 jointly constitute a first resistance means 6.

Figure 6:
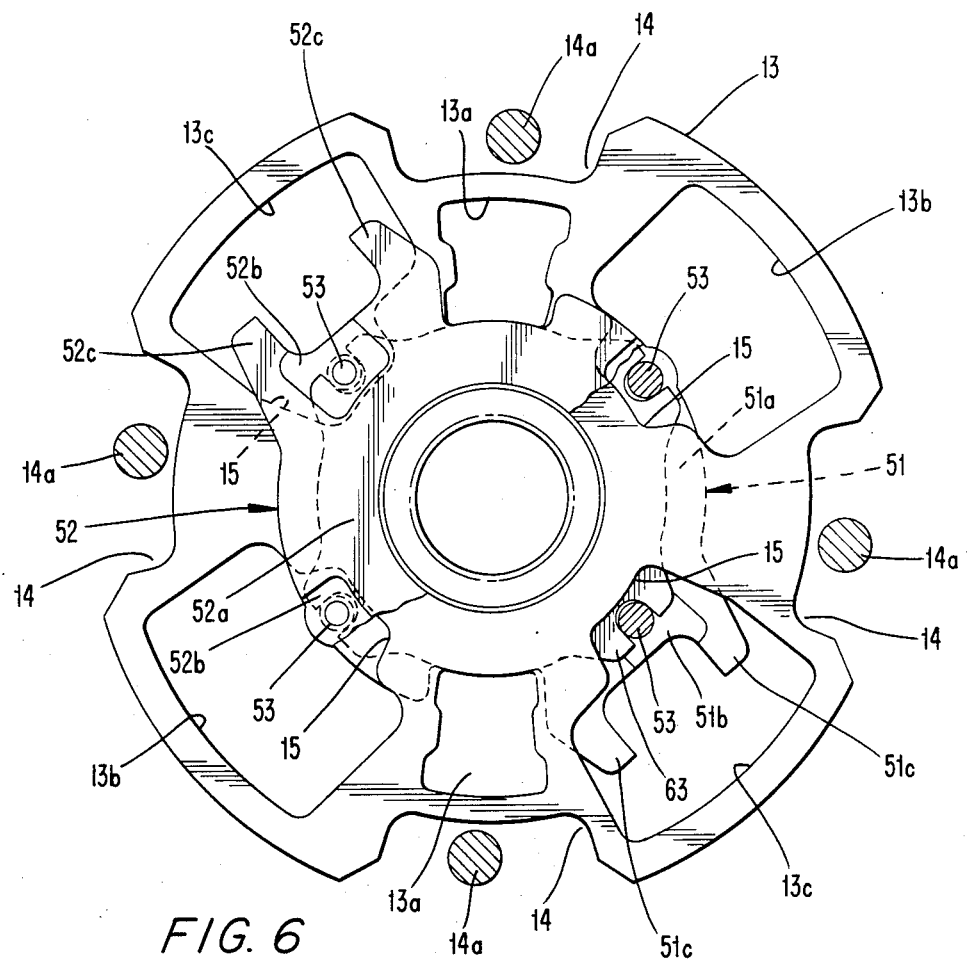
FIG. 6 is a front elevational view of a flange member, a control member, and a first pressure plate in the clutch disk assembly shown in FIG. 1.

The control plates 51, 52, the first pressure plate 63, and the flange member 13 are shown as being in the normal condition in FIG. 6.

Friction plates 71, 72 are disposed between the control plate 51 and the drive plate 2 and between the control plate 52 and the sub-plate 3, respectively. A second pressure plate 73 is arranged between the friction plate 72 and the sub-plate 3 and has an axial projection 73a extending axially movably through an engagement recess 31 defined in the sub-plate 3. The friction plates 71, 72 are sandwiched between the control member 5 and the drive plate 2 and the sub-plate 3 under the resiliency of a second spring means 74 such as a disc spring positioned under compression between the pressure plate 73 and the sub-plate 3. The friction plates 71, 72, the second pressure plate 73, and the second spring means 74 jointly constitute a second resistance means 7.

The total thickness of the members 61, 63 and 64 in an axial direction is relatively thick compared to the thickness of the member 62, while the total thickness of the members 72, 73 and 74 in an axial direction is relatively thick compared to the thickness of the member 71. This arrangement together with the displaced projections 51b, 52b of the control plates 51, 52 and the position of the first resist means 6 allows a simple construction with a relatively small axial length.

The friction plate 71 may be fixed to the drive plate 2 (or the bushing 25) by known fastening means. Similarly, the friction plate 72 may be fixed to the second pressure plate 73 by known fastening means.

The first and second spring means 64, 74 of the first and second resistance means 6, 7, respectively, have resilient forces selected not to cause the conrol plate 51 to flex resiliently. Since the control plates 51, 52 are interconnected by the connecting pins 53 extending through the notches 15 defined in the flange member 13 radially inwardly of the spring windows 13b, 13b, 13c, 13c therein, the control member 5 can have as large a rigidity as possible where the control plates 51, 52 are of a constant thickness. The thickness of the control plates 52, 52 can be selected as desired, and the resilient forces of the first and second resilient means 64, 74 are kept out of mutual interference. Accordingly, the axial forces exerted by the first and second resilient (force exerting) means 64, 74 of the first and second resistance means 6, 7, respectively, are prevented from interfering with each other (i.e., are mechanically isolated from one another) and hence are maintained stably.

The first pressure plate 63, the disc spring 64, the second pressure plate 73, and the disc spring 74 are not positionally limited to the positions shown in FIG. 4. They may be positioned in opposite relation to those illustrated, or arranged on one side of the flange member 13. The disc springs 64, 74 may be replaced with other springs such as corrugated springs or conical coil springs.

Figure 5:
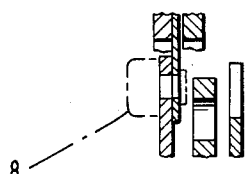
FIG. 5 is a fragmentary cross-sectional view taken along line V—V of FIG. 1.

Designated in FIG. 5 at 8 is a counterweight.

Operation of the clutch disk assembly thus constructed will be described. The description will be directed chiefly to the control member 5 and the first and second resistance means 6, 7 in relation to torque versus angular displacement characteristics. The following description is based for ease of illustration on the assumption that the hub member 1 and the flange member 13 are fixed in the position of FIG. 1 and the assembly composed of the drive plate 2 and the sub-plate 3 with the friction linings 22, 22 attached is angularly displaced counterclockwise from the FIG. 1 position.

When the assembly is angularly displaced counterclockwise from the FIG. 1 position, the coil springs SP1, SP1 are first compressed, and then one of the coil springs SP2, SP2 is compressed, followed by compression of the other coil spring SP2. Finally, the coil springs SP3, SP3 are compressed. As shown in the first quadrant of the graph of FIG. 7, the resilient forces of these coil springs are successively added as the angular displacement increases, and as a result the torque varies. When the assembly is angularly displaced back clockwise, the resilient forces from the coil springs are successively reduced. During such operation, the control member 5 is angularly moved in unison with the assembly and relative to the flange member 13 until the coil springs SP3, SP3 are compressed, and the first resistance means 6 acts to create a hysteresis H1. At the same time that the coil springs SP3, SP3 start being compressed, the connecting pins 53 are brought into abutment against circumferential edges of the recesses 15, whereupon the control member 5 is coupled with the flange member 13 and prevented thereby from being angularly displaced. Then, the second resistance means 7 acts to create a hysteresis H2.

The foregoing operation is summarized in the following table 1, in which O indicates an operative mode and X an inoperative mode:

TABLE 1

| Member | K1 (k1) | K2 (k2) | K3 (k3) | K4 (k4) |
|---|---|---|---|---|
| Both springs SP1 | O | O | O | O |
| One spring SP2 | X | O | O | O |
| Other spring SP2 | X | X | O | O |
| Both springs SP3 | X | X | X | O |
| 1st resist means 6 | O | O | O | X |
| 2nd resist means 7 | X | X | X | O |
| Hysteresis | H1 | H1 | H1 | H2 |

As seen from the table 1, the ranges K1 (k1), K2 (k2), K3 (k3) can be regarded as one range, while the range K4 (k4) can be regarded as another range. The coil springs SP1, SP1 define first spring members, and the coil springs SP3, SP3 define second spring members.

Clockwise angular displacement from the FIG. 1 position will not be described as it can readily be understood from the above description.

Figure 7:
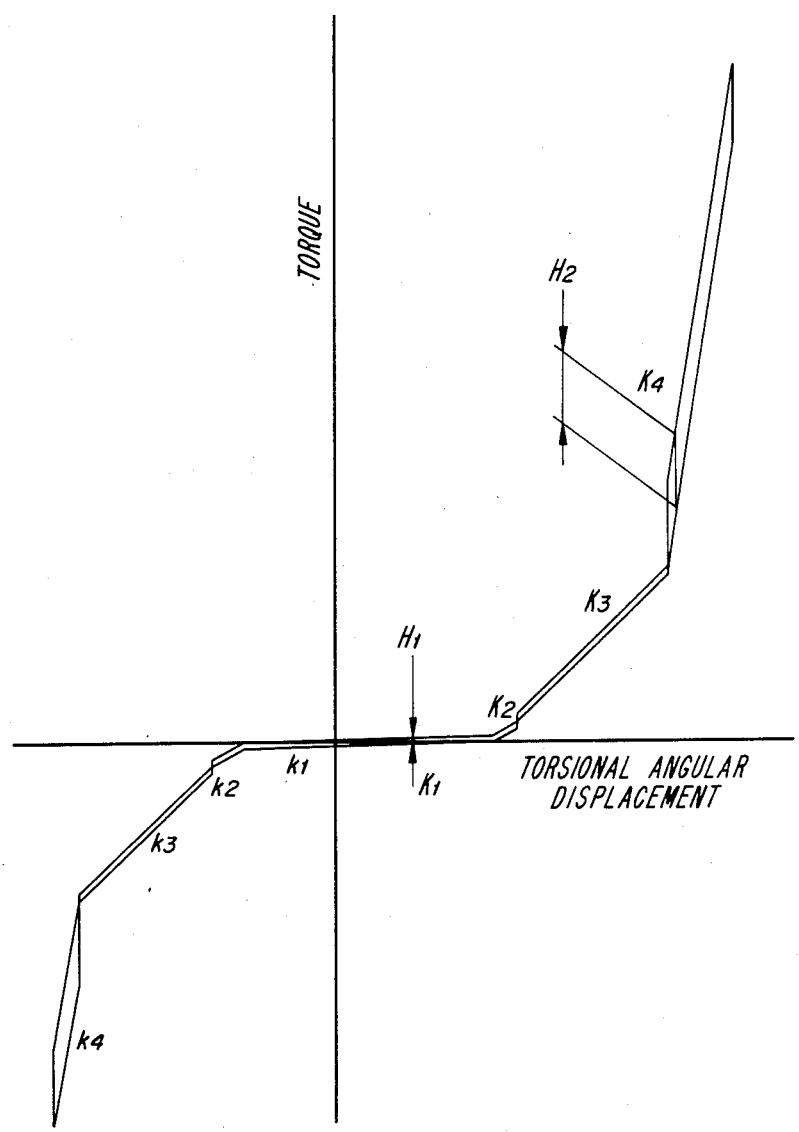
FIG. 7 is a graphic representation of the relationship between torque and angular displacement of the clutch disk assembly according to the present invention.

The torque-angular displacement characteristics are shown in the third quadrant of the graph shown in FIG. 7.

With the arrangement of the present invention, as described above in detail, the control member can be of an increased rigidity, and the forces associated with the resilient force exerting means of the two resistance means are disposed out of mutual interference, so that the hysteresis will be kept stable for a long period of time.

Since the control member is disposed astride of the flange member close to the first resistance means interposed between the flange member and the control member, the control member can be rendered small in size, the clutch disc assembly undergoes a relatively small moment of inertia, and is capable of sharp clutch disconnection.

The control member has connecting pins extending axially through the notches defined in the flange member radially inwardly of the spring windows defined therein. There is no need for notches or through holes which would otherwise be formed in the flange member intermediate between adjacent spring windows in the circumferential direction. As a consequence, the spring windows can be larger in size, the angular displacement of the clutch disk assembly can be greater, and hence torque-angular displacement characteristics can be established which are effective in reducing various vibrations and noises.

The control member is composed of two control plates positioned one on each side axially of the flange member in parallel relationship, each of the control plates having a frictional contact surface and a projection extending radially outwardly therefrom and displaced axially therefrom for a prescribed distance. Preferably, the conrol plates, the first and second pressure plates, the drive plate, and the sub-plate are made from the same material and have a substantially similar surface roughness. The control plates are interconnected by connecting members extending through the notches defined radially inwardly of the spring windows in which spring members are disposed. The first resistance means includes thick resistance members positioned where the projection is displaced away from the frictional contact surface toward the flange member. This allows the clutch disk assembly to be simple in construction with a relatively small axial length.

Although a certain preferred embodiment has been shown and described, it should be understood that many changes and modifications may be made therein without departing from the scope of the appended claims.

What is claimed is:

1. A clutch disk assembly comprising a hub member adapted to be coupled to a transmission shaft, a flange member mounted on said hub member for corotation, a drive plate extending parallel to said flange member and rotatable relative to said hub member, a friction lining secured to a radially outward portion of said drive plate, a sub-plate extending parallel to said flange member and arranged axially spaced from said drive plate across said flange member for rotation with said drive plate, spring members mounted in windows defined in said sub-plate, said drive plate, and said flange member and arranged axially across said flange member, said drive plate, and said sub-plate for producing resistive forces against relative rotation of said flange member and said drive plate and said sub-plate, a control member positioned between said flange member and said drive plate and said sub-plate and disposed astride of said flange member through notches defined therein radially inwardly of said windows, said control member being engageable with said drive plate and said sub-plate and rotatable relative to said flange member in a first operative range of relative rotation of said flange member and said drive plate and said sub-plate, and being releasable from engagement with said drive plate and said sub-plate, engageable with said flange member, and rotatable relative to said drive plate and said sub-plate in a second operative range of said relative rotation, a first resistance means including first force exerting means arranged between said control member and said flange member for exerting an axial force that produces a frictional resistive force against relative rotation of said control member and said flange member, and a second resistance means including second force exerting means arranged between said control member and said drive plate and said sub-plate for exerting an axial force that produces a frictional resistive force against relative rotation of said control member and said drive plate and said sub-plate, said first resistance means being operative during said first operative range of relative rotation to create a first hysteresis and said second resistance means being operative during said second operative range of relative rotation to create a second hysteresis, said first resistance means being substantially inoperative in said second operative range, said control member having a rigidity selected to prevent said axial resistive forces exerted by said first and second force exerting means of said first and second resistance means from interfering with each other.

2. A clutch disk assembly according to claim 1, wherein said control member comprises two control plates disposed one each side axially of said flange member in parallel relation, and connecting members extending axially through said notches and interconnecting said control plates.

3. A clutch disk assembly according to claim 2, wherein said first resistance means comprises a first pressure plate coupled to said control member for displacement relative thereto in a substantially axial direction, a friction plate arranged between said first pressure plate, one of said control plates of said control member, and said flange member, and first spring means interposed resiliently between said control member and said first pressure plate, and said second resistance means comprises a second pressure plate coupled to one of said drive plate and said sub-plate for displacement relative thereto in a substantially axial direction, a friction plate arranged between the other of said drive plate and said sub-plate, said second pressure plate, and said control member, and second spring means interposed resiliently between one of said drive plate and said sub-plate and said second pressure plate.

4. A clutch disk assembly according to claim 3, wherein said control member is held in operative engagement with one of said spring members which can be compressed to produce one of said resistive forces in a range of the overall extent of relative rotation of said flange member, said drive plate, and said sub-plate so that said control member will be operated under the control of said one spring member.

5. A clutch disk assembly according to claim 1, wherein said spring members include a first spring member for producing a resistive force in said first operative range and a second spring member for producing a resistive force in said second operative range, said control member having an arm extending radially outwardly into engagement with circumferentially opposite ends of one of said spring members.

6. A clutch disk assembly according to claim 5, wherein said control member comprises two control plates disposed one each side axially of said flange member in parallel relation, and connecting members extending axially through said notches and interconnecting said control plates.

7. A clutch disk assembly according to claim 6, wherein said first resistance means comprises a first pressure plate coupled to said control member for displacement relative thereto in a substantially axial direction, a friction plate sandwiched between said first pressure plate, one of said control plates of said control member, and said flange member, said first force exerting means comprising first spring means interposed resiliently between said control member and said first pressure plate, and said second resistance means comprises a second pressure plate coupled to one of said drive plate and said sub-plate for displacement relative thereto in an axial direction only, a friction plate sandwiched between the other of said drive plate and said sub-plate, said second pressure plate, and said control member, said second force exerting means comprising second spring means interposed resiliently between one of said drive plate and said sub-plate and said second pressure plate.

8. A clutch disk assembly according to claim 7, wherein said control plates are of the same material and substantially the same surface roughness as those of said drive plate and said sub-plate, said first and second pressure plates being also of the same material and substantially the same surface roughness as those of said drive plate and said sub-plate.

9. A clutch disk assembly according to claim 1, wherein said control member comprises two control plates disposed one on each side axially of said flange member in parallel relation, said control plates having frictional contact surfaces and projections extending radially outwardly therefrom, respectively, and displaced in the same axial direction for a prescribed interval, and connecting members extending through said notches and affixed to said projections, said first resistnce means including thick resistance members positioned where said projections are displaced away from said frictional contact surfaces toward said flange member.

10. A clutch disk assembly according to claim 9, wherein said first resistance means comprises a first pressure plate coupled to said control member for displacement relative thereto in a substantially axial direction, a friction plate arranged between said first pressure plate, one of said control plates of said control member, and said flange member, said first force exerting means comprising first spring means interposed resiliently between said control member and said first pressure plate, said first pressure plate, said friction plate, and said first spring means comprising said thick resistance members, and said second resistance means comprises a second pressure plate coupled to one of said drive plate and sub-plate for displacement relative thereto in an axial direction only, a friction plate arranged between the other of said drive plate and said sub-plate, said second pressure plate, and said control member, said second force exerting means comprising second spring means interposed resiliently between one of said drive plate and said sub-plate and said second pressure plate.

* * * * *